United States Patent

Hershey et al.

[11] Patent Number: 5,878,034
[45] Date of Patent: Mar. 2, 1999

[54] SPACECRAFT TDMA COMMUNICATIONS SYSTEM WITH SYNCHRONIZATION BY SPREAD SPECTRUM OVERLAY CHANNEL

[75] Inventors: John Erik Hershey, Ballston Lake; Stephen Michael Hladik, Albany; Gary Jude Saulnier, Rexford, all of N.Y.

[73] Assignee: Lockheed Martin Corporation, King of Prussia, Pa.

[21] Appl. No.: 655,112

[22] Filed: May 29, 1996

[51] Int. Cl.[6] ............................... H04B 7/212; H04J 3/06
[52] U.S. Cl. .......................... 370/321; 370/324; 370/350; 370/515; 342/357; 375/365; 455/13.2; 455/67.6; 455/430; 455/431
[58] Field of Search ................................ 370/315, 316, 370/320, 321, 324, 342, 347, 350, 503, 514, 515, 516, 519; 340/825.54; 342/352, 353, 356, 357; 375/200, 362, 364, 365; 455/427, 428, 430, 431, 11.1, 12.1, 13.1, 13.2, 67.1, 67.6

[56] References Cited

U.S. PATENT DOCUMENTS

| 3,742,498 | 6/1973 | Dunn | 370/515 |
|---|---|---|---|
| 4,292,683 | 9/1981 | Jueneman | 370/324 |
| 4,574,379 | 3/1986 | Eng et al. | 370/324 |
| 4,617,674 | 10/1986 | Mangulis et al. | 370/324 |
| 4,745,599 | 5/1988 | Raychaudhuri | 370/348 |
| 4,800,560 | 1/1989 | Aoki et al. | 370/324 |
| 5,017,926 | 5/1991 | Ames et al. | 342/353 |
| 5,041,833 | 8/1991 | Weinberg | 342/357 |
| 5,126,748 | 6/1992 | Ames et al. | 342/353 |
| 5,619,211 | 4/1997 | Horkin et al. | 342/357 |
| 5,680,143 | 10/1997 | Hershey et al. | 342/375 |

*Primary Examiner*—Alpus H. Hsu
*Attorney, Agent, or Firm*—W. H. Meise; G. H. Krauss; S. A. Young

[57] ABSTRACT

In a time division multiple access spacecraft communication system, each ground station determines when to send its information packets to arrive at the spacecraft at the beginning of a time slot. The calculation is based upon knowledge of the locations of the spacecraft and the transmitting ground station. A master ground station determines the location of the spacecraft by the use of the propagation delays between the various ground stations (including itself) and the spacecraft, together with knowledge of the locations of the ground stations. The spacecraft location is then transmitted back to the various ground stations. The determination of propagation delay by each ground station is performed by repeatedly transmitting a ranging signal containing a multiple-bit unique word to the spacecraft, and counting spreading code chips until the next unique word is received from the spacecraft.

17 Claims, 5 Drawing Sheets

SPACECRAFT TDMA COMMUNICATIONS SYSTEM WITH SYNCHRONIZATION BY SPREAD SPECTRUM OVERLAY CHANNEL

FIELD OF THE INVENTION

This invention relates to time-division-multiple access communications systems in which the communications channel includes a loop-back through a spacecraft, and more particularly to such systems in which a spread spectrum overlay channel is superposed on the data channels for aiding in establishing network time synchronization based on the spacecraft location relative to the earth stations, and for communicating spacecraft location information among the earth Stations.

BACKGROUND OF THE INVENTION

Communication channels on spacecraft or satellites may be dedicated for use between particular ground stations, in which case transmissions may take place continuously from one of the stations to the other. Bidirectional transmissions may take place if some means is provided for separating the signals, such as frequency-division multiple access. When multiple ground stations use the same spacecraft channel for communications among themselves, some arrangement must be provided for preventing simultaneous transmission of two or more signals through the same spacecraft channel, because such signals may interact or interfere in the channel, so that information is lost. In one prior-art approach, each transmission must be terminated before the next one is transmitted through the channel. This mode of use is known as time-division multiple access, or TDMA. In contrast, a random access scheme known as "Aloha" allows each ground station to transmit packets at random times in a mode which probabilistically may be in contention with other stations, with the result that, when there are many users of the channel, many of the transmitted packets interfere. Aloha provides a rescheduling protocol which enhances the likelihood that later transmissions will traverse the channel without interference. One such Aloha system is described in U.S. Pat. No. 4,745,599, issued May 17, 1988 in the name of Raychaudhuri. The Aloha type systems suffer from the disadvantage that utilization of the spacecraft channel is essentially wasted during the time in which it processes signals which interfere. It should be noted that a spacecraft channel may partially overlap the frequency or frequencies of adjacent channels in "frequency re-use" operation.

The utilization of a spacecraft channel may be improved by synchronizing the transmissions from the various ground stations in such a manner that each packet arrives at the spacecraft at the beginning of one of a plurality of sequential "slot" intervals. Each slot interval is equal in time duration to the packet interval, so that a stream of packets arriving at the spacecraft from different ground stations, with each packet arriving at the time of the beginning of a different slot interval, will traverse the spacecraft channel in a continuous sequence, without times in which the spacecraft channel is unutilized, and without interference by one packet with the signal of the two adjacent packets. This greatly improves the utilization of the channel, but is difficult to implement because each ground station is at a different distance from the spacecraft, and therefore signals from each ground station have different propagation times to the spacecraft. In addition, because the spacecraft moves relative to the ground stations, the propagation delays change with time. Some TDMA schemes provide a slot which is longer than the duration of a data packet, so that slight timing errors do not cause a mistimed data packet to interfere with the communication in an adjacent time slot. Such "guard times," however, reduce the throughput of the channel in proportion to their length, and it is therefore desirable to minimize the guard time. Known methods for reducing required guard intervals generally consume spacecraft power and bandwidth in proportion to the number of active ground stations in a network so that the cost in terms of data-carrying capacity becomes significant in large networks. Therefore, an improved method for synchronization control of a communications spacecraft channel is desired.

SUMMARY OF THE INVENTION

Generally speaking, in a time division multiple access spacecraft communication system, each ground station determines when to send its information packets so as to arrive at the spacecraft at the beginning of an assigned time slot. In the invention, the calculation is based upon knowledge of the location of the spacecraft. A master ground station determines the location of the spacecraft by the use of the propagation delays between three or more ground stations (possibly including itself) and the spacecraft, together with knowledge of the locations of these ground stations. The spacecraft location is then transmitted to all the ground stations in the network, including those which do not perform ranging, if any. The determination of propagation delay is performed at each of three or more ground stations by recurrently or repeatedly transmitting a broadband ranging signal to the spacecraft, receiving the repeated signal, and measuring the round-trip delay. In a preferred embodiment of the invention, the broadband ranging signal contains a multiple-bit unique word modulated by a binary pseudorandom sequence comprising a plurality of chips, and the measurement of delay is performed by counting the number of chip intervals from the time of transmission of a unique word until the unique word is received from the spacecraft. The delay establishes the range to the spacecraft. In one embodiment, a broadband ranging signal is in effect "overlaid" on a plurality of relatively narrowband TDMA traffic channels.

More particularly, a method for synchronization of TDMA transmissions from ground stations to a spacecraft, for maximizing the utilization of the spacecraft channel, includes various processing steps at each of the three or more ground stations which perform the ranging. In a preferred embodiment, a unique word is modulated by a pseudorandom spreading sequence, and the resulting modulated signals are transmitted from the ground station toward the spacecraft at a transmission time. The unique word is a plurality of sequential bits modulated by the spreading sequence. The spacecraft retransmits the ranging signal, (a sequence of synchronizing data bits including the unique word modulated by the spreading sequence), and the ranging signal returns to the ground station. The ground station responds to the first one of the unique words received after the step of transmitting a unique word, by noting the reception time of the unique word. This process of receiving the unique word requires de-spreading the received signal using a replica or copy of the pseudorandom spreading sequence. The difference is taken between the transmission and reception times of the unique word, to form an estimate of the round-trip propagation delay between the ground station and the spacecraft. The one-way propagation delay is one-half of a difference, where the difference is that between the two-way or round-trip propagation delay and the inherent internal delay in the spacecraft loopback channel. The steps of transmitting a unique word, responding to the first one of the unique words, and taking the difference between the transmission and reception times, are repeated a predetermined number of times, to form a group of measured delays. In one embodiment of the invention, the number of repetitions is three. Since there may be other ground stations transmitting the same unique word at different times, each ground station uses a different orthogonal or almost-orthogonal pseudorandom spreading sequence, making the ground station relatively insensitive to the transmissions of the other ground stations. The propagation delay is transmitted to all the other ground stations in one embodiment of the invention, and may be used to synchronize transmission of packets of information so that they arrive at the spacecraft at a particular time. In the preferred embodiment, the propagation delays determined by the various ranging ground stations are transmitted to a master ground station, which combines the propagation delays with information relative to the known locations of the ranging ground stations, to determine the location of the spacecraft. In addition, several sets of range measurements taken over time can be used to determine the spacecraft's ephemerides or orbital parameters. This location information is, in turn, transmitted from the master ground station to the other ground stations, which use it, together with knowledge of their own locations, to determine the appropriate packet transmission times. The ground stations which transmit data to other ground stations by way of the spacecraft need not be the same ones which transmitted the ranging signals to establish the propagation delay to the spacecraft, or which determined the location of the spacecraft. That portion of the ranging signals which does not include the unique word may be used, in one embodiment of the invention, for transmitting one or more of range information, spacecraft position, location information, or control data to other ground stations. The unique word or another sequence of symbols included in the master ground station's ranging signal may be used to mark a TDMA communication system's frame epoch.

DESCRIPTION OF THE INVENTION

Figure 1:
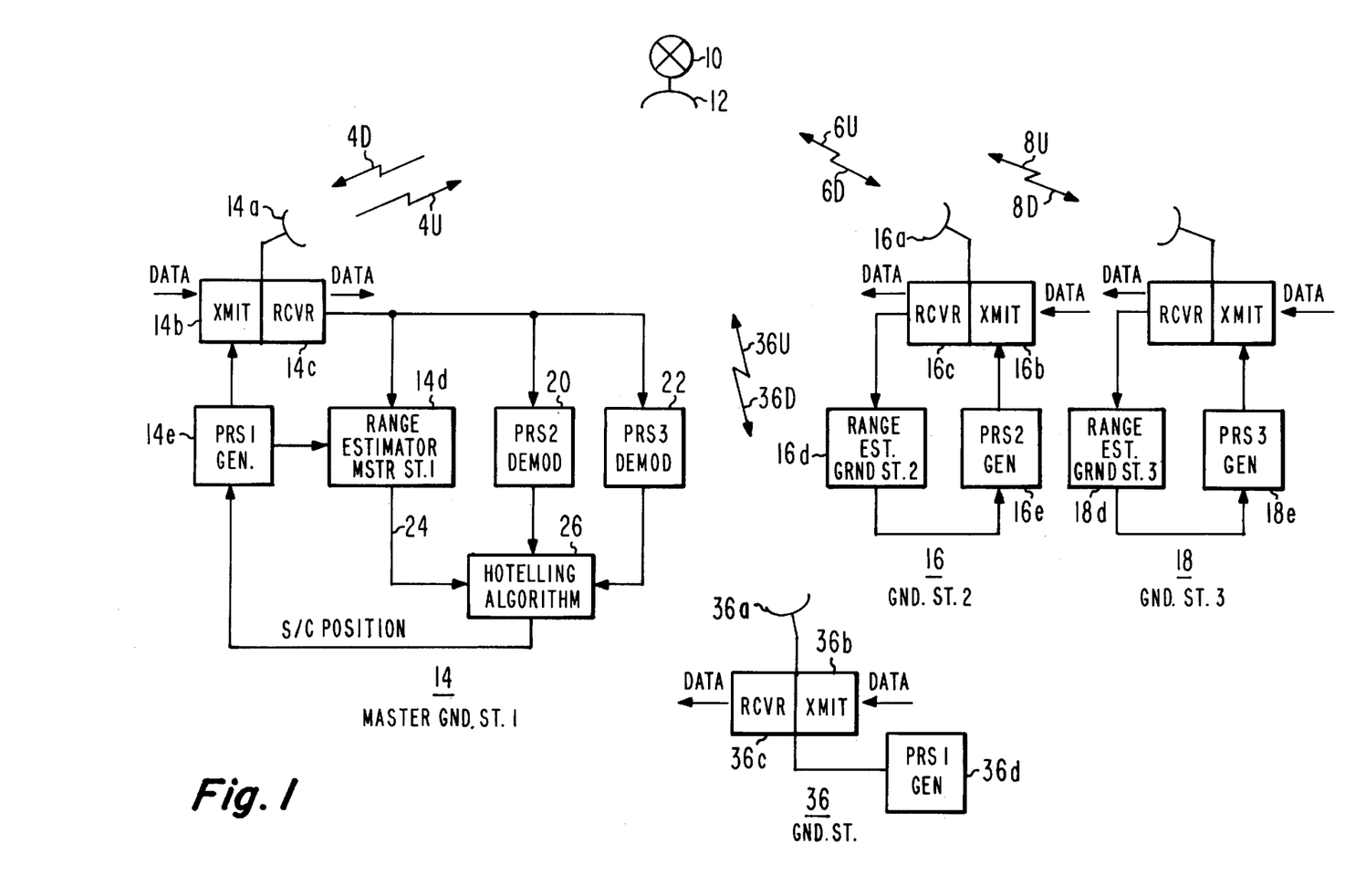
FIG. 1 is a simplified block diagram illustrating a plurality of ground stations communicating with each other by way of a spacecraft repeater.

In FIG. 1, a spacecraft 10 includes an antenna 12, and includes a known repeater or transponder channel for receiving uplink signals, and for repeating the signals in one or more downlinks. Those skilled in the art know that the downlink signals may be in a different frequency range, preferably a lower frequency range, than the uplink signals. First, second and third ground stations 14, 16, and 18, respectively, transmit signals to the spacecraft 10 by way of uplinks 4U, 6U, and 8U, respectively, and receive signals from the spacecraft by way of downlinks 4D, 6D, and 8D, respectively. Second ground station 16 includes an antenna 16a connected to a transmitter 16b and a receiver 16c. Transmitter 16b receives data to be transmitted from a local source, not illustrated, and modulates the data into packets, which may be of fixed duration, for transmission (over uplink 6U) using time-division multiple access of the satellite channel, and receiver 16c couples data packets received over downlink 6D to a local data sink, not illustrated. Receiver 16c is also connected to a range estimator block 16d. The estimated range is coupled to a pseudorandom ranging signal generator 16e, which modulates the range information by means of a pseudorandom sequence (PRS) 2 code which is unique to second ground station 16. Similarly, third ground station 18 includes an antenna 18a connected to a transmitter 18b and a receiver 18c. Transmitter 18b receives data to be transmitted from a local source, not illustrated, and modulates it into packets of fixed duration for transmission by way of uplink 8U to the spacecraft, and receiver 18c couples data packets received over downlink 8D to a local sink, not illustrated. Receiver 18c is also connected to a range estimator block 18d. The estimated range is coupled to a pseudorandom ranging signal generator 18e, which modulates the range information by means of a pseudorandom (PRS) 3 code which is unique to third ground station 18. The data applied to each transmitter 16b, 18b is transmitted within at least one channel to spacecraft 10. In a particular embodiment of the invention, the data transmitted by each of stations 16 and 18 is modulated onto one of more of a plurality of carrier frequencies within the bandwidth of the spacecraft data channel; this frequency division within the spacecraft channel allows plural data signals to pass through the same spacecraft transponder channel, and allows their separation after passing through the spacecraft repeater channel. A time division multiple access (TDMA) scheme is used within each frequency division of the spacecraft transponder channel. The multiple access technique is thus actually a FDMA/TDMA hybrid, in which each frequency band or "channel" of the repeater is shared by multiple ground stations. On the other hand, the ranging signals transmitted by each ground station 14, 16, and 18 are in code-division multiple access format, which means that they are spread-spectrum or wideband signals, which take advantage of the entire spacecraft channel for best time resolution, but which do not significantly interfere with the relatively narrow-band data transmissions or with each other.

A first or master station 14 in FIG. 1 includes an antenna 14a which transmits signals produced by a transmitter 14b over uplink 4U toward spacecraft 10, and which receives signals retransmitted from spacecraft 10 by way of a downlink 4D, and couples the signals so received to a receiver 14c. Transmitter 14b receives data to be transmitted from a local source, not illustrated, and modulates the data into packets, which may be of fixed or of variable duration, for transmission to the spacecraft using time division multiple access, and receiver 14c couples data packets received from the spacecraft to a local sink, not illustrated. Receiver 14c is also connected to a range estimator block 14d.

Master ground station 14 of FIG. 1 also includes a PRS 2 demodulator 20 and a PRS 3 demodulator 22 coupled to receiver 14c, for receiving and demodulating the pseudorandom codes of the ranging signals originally transmitted by second ground station 16 and third ground station 18, respectively, to thereby enable the master ground station to retrieve the range information generated by ground stations 16 and 18. The range estimation or measurement produced by master station range estimator block 14d is coupled by a path 24 to a processor 26, and spacecraft range information relating to corresponding measurements performed at second ground station 16 and third ground station 18 is coupled to processor block 26. Processor 26 performs an averaging-type of operation on the various range estimates, as described in conjunction with FIG. 2, to reduce the plurality of measured ranges to a single set of most probable ranges. In a preferred embodiment of the invention, the processing in block 26 includes a Hotelling algorithm, such as that described in the publication "Global Positioning System", volume 1, ISBN 0936406,00-3, published in 1980 by The Institute of Navigation, 1800 Diagonal Road, Suite 480, Alexandria, Va., 22314, which iteratively produces an estimate of the actual spacecraft position. Such an estimate of the location may be derived from range measurements from as few as three separate locations; the first range estimate localizes the spacecraft to a sphere of known diameter, the second range measurement reduces the possible locations to an arc, and the third identifies a location on the arc. The estimate of the spacecraft position generated by the processing in block 26 is coupled to PRS1 generator 14e, and is encoded with, or modulated by, pseudorandom code PRS1 for transmission, by way of the spacecraft, to the other ground stations of the system, including ground stations 16 and 18.

Ground stations other than master ground station 14 of FIG. 1, such as second ground station 16 and third ground station 18, decode the information relating to spacecraft position by using a demodulator having stored therein a replica of the master station pseudorandom code PRS1. Each ground station thus has available a recent estimate of the spacecraft position, based upon a plurality of range measurements from three or more of the ground stations. This spacecraft position is also available to ground stations of the system which have no independent ranging equipment. Since the ground stations all know their own positions in absolute coordinates, either as a result of surveys, or, for a mobile ground station, by the use of a global positioning system (GPS) receiver, each ground station then calculates its own range to (or from) the spacecraft. Since each ground station knows its own position and the position of the spacecraft, each ground station can determine, with great exactitude, the range between itself and the spacecraft. In turn, the range (together with the speed of the electromagnetic signal, which is the speed of light C) uniquely establishes the one-way electromagnetic signal propagation time between the ground station and the spacecraft. The calculations of range, given the locations of the spacecraft and of the ground station, are very conventional, and are not elaborated herein.

Each ground station must, however, still determine how much time to allow for propagation of each packet to the spacecraft so as to make it arrive at a particular time, namely at the beginning of the slot interval for which it is destined. In general, this is determined by each ground station from the known location of the ground station itself and the location of the spacecraft, together with synchronization symbols transmitted by the master ground station and received by each other ground station. More particularly, the time of arrival of the unique word from the master ground station establishes the beginning of a frame interval at the spacecraft, and may be considered to be a master timing signal. The same spread spectrum ranging signal from the master ground station is used to perform ranging, to carry the calculated spacecraft location, and to mark the system frame timing or time epoch. In particular, the ranging signal from the master ground station carries synchronization symbols which mark the frame time epoch. A frame begins concurrently with the arrival at the spacecraft of a specific portion, namely the synchronization symbol sequence, of the master ground station timing signal. The master ground station timing signal is manifested as an embedded unique word (UW) prefix 412 in the data stream of ranging signal 410, as described in conjunction with FIG. 4a. The master ground station ranging signals may occur more frequently than the master frame timing signal, or vice versa, and a ranging signal may coincide with each timing signal. In a preferred embodiment of the invention, the timing signals occur at the same rate as the unique words, so that each unique word corresponds to a timing signal, so that when stations come on-line their network time synchronization time is minimized. Each ground station other than the master ground station receives the master frame timing epoch or time signal in the form of a unique word, and decodes it (using the PRS1 which is known to each ground station), and, knowing it's own location, and the relevant propagation times, calculates when each recurrent frame interval begins at the spacecraft. Each ground station can then adjust its own data signal transmission times so that each slot of data arrives at the spacecraft at the beginning of the assigned time slot within the frame interval at the spacecraft. Thus, the ranging signals transmitted by ground stations 16 and 18 have the functions of identifying the range to the spacecraft, and they carry information relating to the current range estimate formed by the ground station to the master station, or to whatever location is performing the spacecraft location determination. The ranging signal of the master ground station performs the task of transmitting to the other ground stations the estimate of the location of the spacecraft, and the unique word portion functions as a master timing signal marking the beginning of each frame for the communication channels passing through the spacecraft wideband channel.

In order to make the context of the invention clear, FIG. 1 also includes a further ground station 36, which comprises an antenna 36a, a transmitter 36b which receives data from a local source (not illustrated), for modulation onto an uplink signal for transmission over an uplink 36U, and a receiver 36c. Receiver 36c receives signals from spacecraft 10 by way of downlink 36D, and extracts data for use by a local data sink. Ground station 36 also includes a PRS1 generator for generating a local replica of the pseudorandom spreading code PRS1 of master ground station 14. This signal is needed to despread the master station's ranging signal. Ground station 36 does not perform any ranging to determine the range from itself to the spacecraft. Instead, ground station 36, and all other like ground stations (not illustrated) derive their information about the spacecraft location by despreading the PRS1 ranging signal originating from master ground station 14, and recovering the spacecraft location which appears therein. The location of the spacecraft, together with knowledge of its own location, allows ground station 36 to determine the range to the spacecraft, and therefore the propagation delay.

Figure 2:
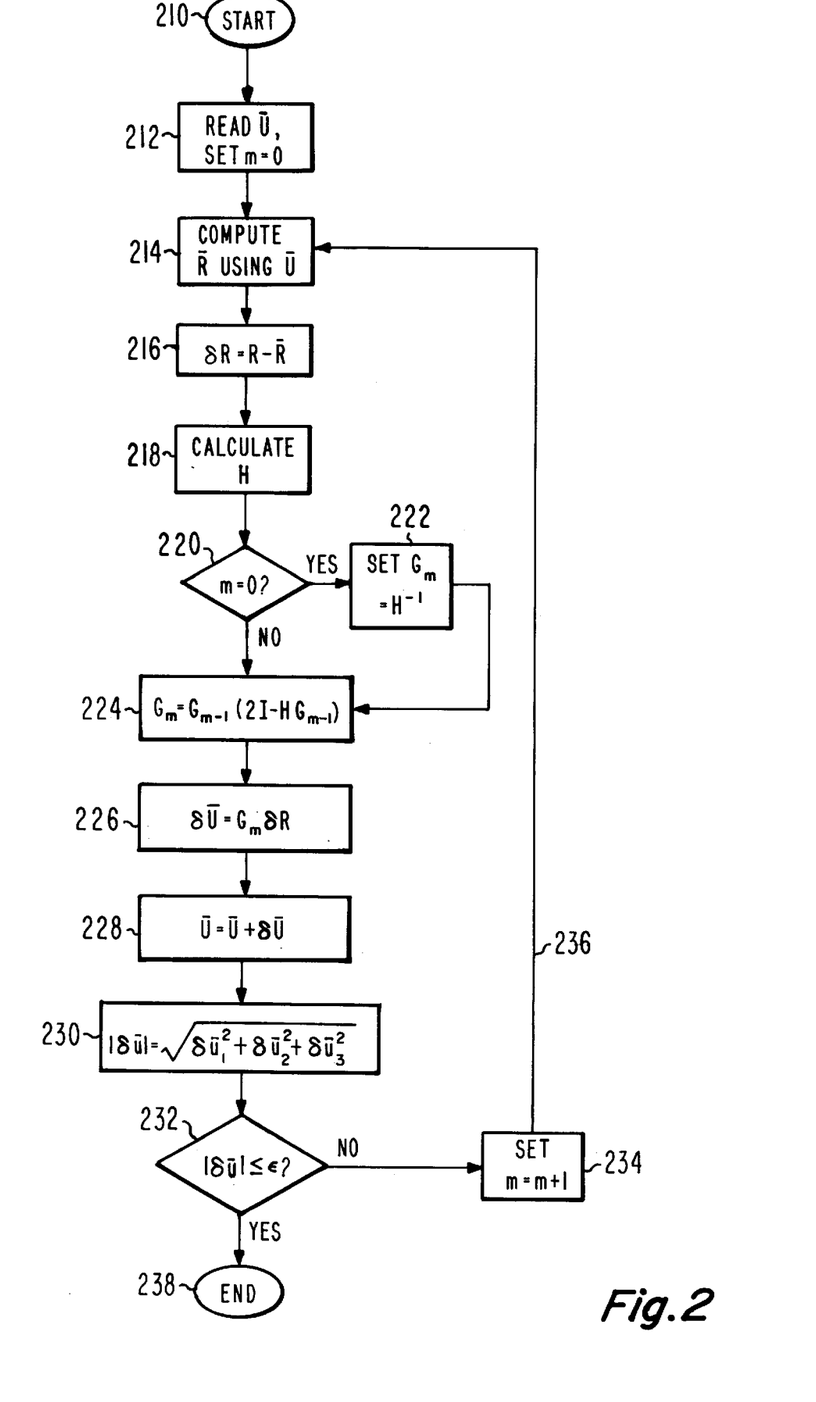
FIG. 2 is a simplified flow chart illustrating an algorithm which may be used at the master station to determine the position of the spacecraft from various known ground-station-to-spacecraft ranges.

FIG. 2 is a simplified representation of a flow chart which may be used at the master station 14 of FIG. 1 to generate an estimate of the spacecraft position from various range measurements. In FIG. 2, the logic begins at a START block 210, and proceeds to a block 212, which represents initialization, including the setting of a loop variable m to the value of zero, representing the first iteration, and the reading of the nominal spacecraft position $\overline{U}$, a column vector, available from a previous estimation. From block 212, the logic flows to a further block 214, which represents the computation of three-dimensional vector $\overline{R}$, $$\overline{R} = (\overline{r}_1, \overline{r}_2, \overline{r}_3)^T \qquad (1)$$

calculated from the components of $\overline{U}$ and the locations of the three ground stations $$(x_{i1}, x_{i2}, x_{i3}) \qquad (2)$$

for stations i, where i=1, 2, and 3. $\overline{U}$ represents the most recent estimate of the spacecraft position, and has components $(\overline{u}_1, \overline{u}_2, \overline{u}_3)$.

From block 214, the logic of FIG. 2 flows to a further block 216, which represents calculation a three-dimensional vector δR $$\delta R = (\delta r_1, \delta r_2, \delta r_3)^T \qquad (3)$$

where $\delta r_i = r_i - \overline{r}_i$ for i=1, 2, and 3; and $R = (r_1, r_2, r_3)^T$ is the vector of the distances from each of the ground stations to the spacecraft.

From block 216, the logic flows to a block 218, which represents calculation of a 3×3 matrix H formed by $$h_i = \left[ \frac{\overline{u}_1 - x_{i1}}{r_i}, \frac{\overline{u}_2 - x_{i2}}{r_i}, \frac{\overline{u}_3 - x_{i3}}{r_i} \right] \qquad (4)$$

for i=1, 2, and 3. From block 218, the logic flows to a decision block 220, which examines the loop variable m, and routes the logic to its YES output if and only if the algorithm is in its first iteration. The YES output leads to a block 222, in which the value of $G_0$ is set equal to $H^{-1}$. Regardless of the iteration, the logic arrives at a block 224, which represents updating of the G matrix to its $m^{th}$ version.

$$G_m = G_{m-1}(2I - HG_{m-1}) \qquad (5)$$

where

I is the identity matrix of conforming dimensions.

From logic block 224 of FIG. 2, the logic flows to a block 226, in which changes $\delta \overline{U} = (\delta_{\overline{u}1}, \delta_{\overline{u}2}, \delta_{\overline{u}3})^T$ to the $\overline{U}$ column vector are computed as $$\delta U = G_m \delta R \qquad (6)$$

following which the logic flows to a block 228. In block 228, the $\overline{U}$ vector is updated as follows $$U = U + \delta U \qquad (7)$$

and, in block 230, the magnitude of the correction to the $\overline{U}$ vector is computed $$|\delta \overline{U}| = \sqrt{\delta \overline{u}_1^2 + \delta \overline{u}_2^2 + \delta \overline{u}_3^2} \qquad (8)$$

Decision block 232 compares $|\delta \overline{U}|$ with a threshold ε. Threshold ε is a number which is preestablished at the threshold between significance and insignificance. If the difference is larger than ε, that is to say, if the difference is deemed significant, the logic leaves logic block 232 by the NO path, and arrives at a block 234. Loop variable in is incremented in block 234, and the logic returns by a path 236 to block 214 for another iteration. The iterations continue until, eventually, the difference is less than ε. If the difference is no larger than ε, the logic leaves decision block 232 by the YES output, and arrives at an END block 238. As mentioned above, the single estimate of the spacecraft position established by the logic of FIG. 2 is coupled to PRS1 generator 14e of master ground station 14 of FIG. 1, and is encoded for transmission, by way of the spacecraft, to the other ground stations.

The Hotelling algorithm depicted in FIG. 2 converges rapidly in this context. In a particular example, the initial guess of the spacecraft position is $\overline{u}_1$=9484.8363 km, $\overline{u}_2$=41083.399 km, and $\overline{u}_3$=0.0 km, where $\overline{u}_1$ is the Cartesian or orthogonal projection of the spacecraft position onto an axis passing from the center of the Earth through the equator at zero longitude, $\overline{u}_2$ is the projection of the spacecraft location onto an axis passing through the equator and 90° from the first axis, and $\overline{u}_3$ is an axis extending from the Earth's center through its North pole. The locations of the three ground stations are assumed to be

Figure 3:
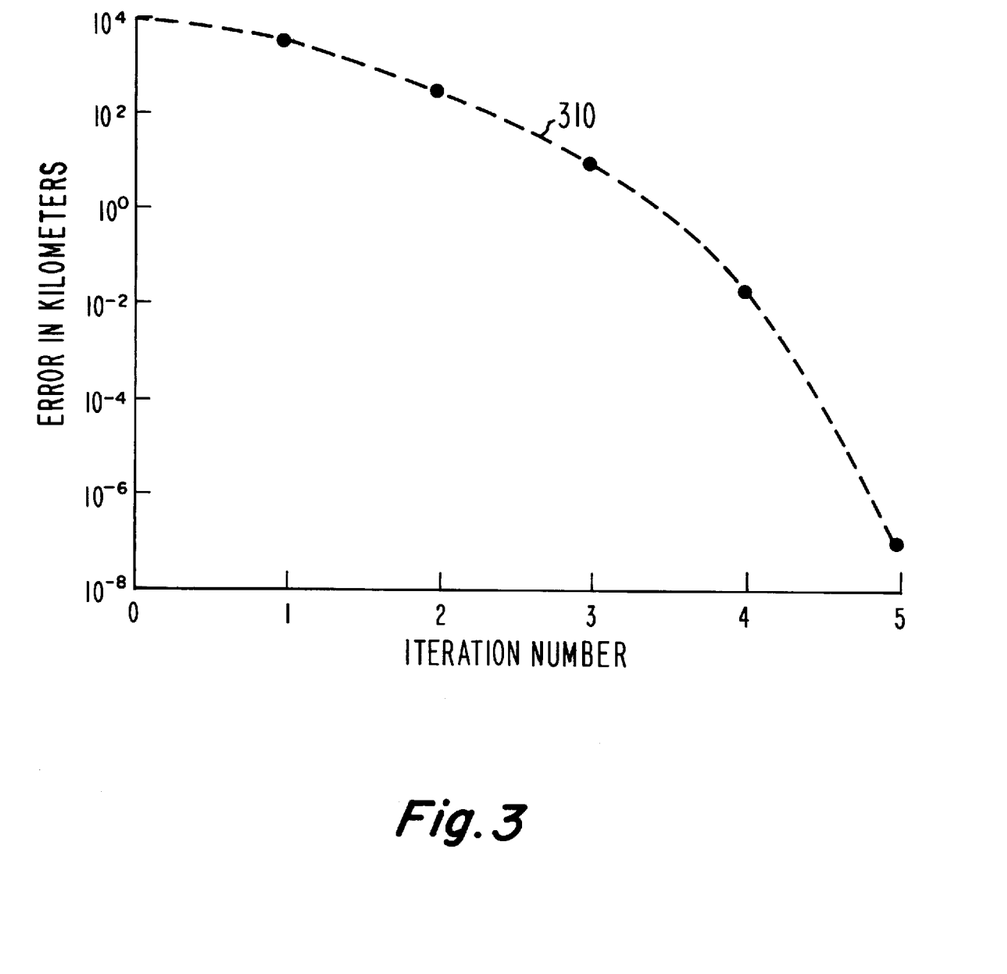
FIG. 3 is a log-scale plot of error in kilometers versus the number of iterations of the logic of FIG. 2 for a particular example.

| i | $x_{i1}$ | $x_{i2}$ | $x_{i3}$ |
|---|----------|----------|----------|
| 1 | 2003.8039 | 1301.2855 | 5913.6315 |
| 2 | 3530.5185 | 2049.8928 | 4885.9342 |
| 3 | 1049.4402 | 4545.6248 | 4350.3632 | and the differences between the true position of the spacecraft and the initial position guess are (−202.958 km, −75.583 km, and −174.860 km). When the algorithm of FIG. 2 is run, convergence occurs after about five iterations, with errors after each iteration as illustrated by the values of plot 310 of FIG. 3.

Figures 4A, 4B:
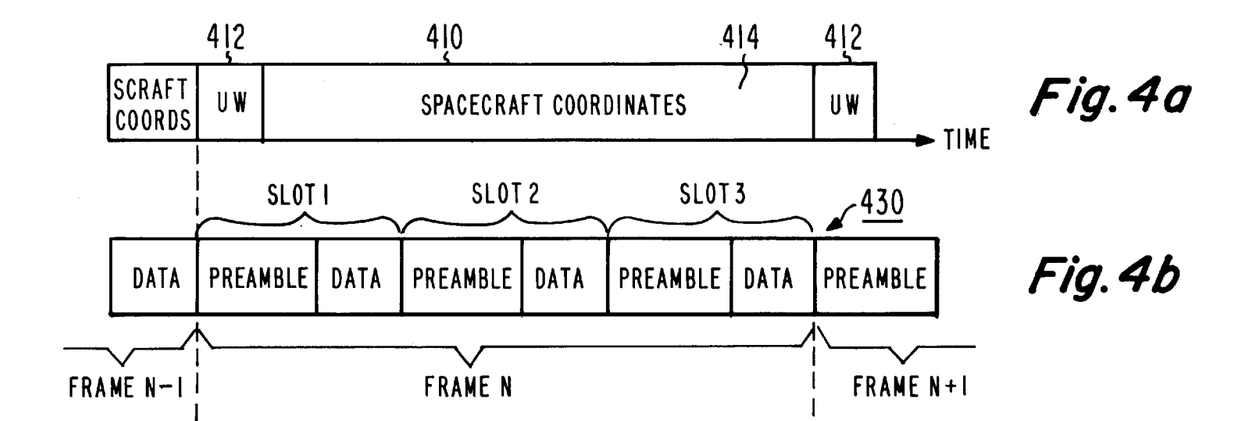
FIG. 4a illustrates the time relationship of the unique word interspersed with spacecraft coordinate information in the data stream of the ranging signal of the master ground station as it arrives at the spacecraft.
FIGS. 4b and 4c illustrate the time relationships of the TDMA data signals (and their preambles) transmitted from two ground stations of the system as they arrive at the spacecraft.

Once the location of the spacecraft is established by the master ground station, the location is encoded using PRS1 at the master station, overlaid on data channels, and transmitted to the spacecraft. FIG. 4a illustrates an exemplary frame interval of the ranging signal 410 from among a plurality of contiguous frames in the ranging signal transmitted by the master ground station. As mentioned above, the master ground station ranging signal includes a unique word (UW) preamble 412 and network synchronization information in a body portion 414 (i.e. message-carrying portion) which may be encoded with, for example, spacecraft coordinate information. The stream of unique words and spacecraft coordinate data which together constitute the ranging signal are spread-spectrum encoded for code division multiple access. Recurrent times T1 represent the beginning of each frame interval at the spacecraft. A complete frame extends from the beginning of a unique word at time T1 until the beginning of the next following unique word at the next time T1. Thus, the illustrated condition of master ground station ranging signal 410 in FIG. 4a is that which occurs when it arrives at the spacecraft. In one embodiment of the invention, each frame interval in FIG. 4a, has a total duration of 40 milliseconds (msec), and contains an eleven-bit unique word, and body 414 contains 69 spacecraft position bits. All eighty bits in the signal from master station 14 are encoded using PRS1. FIG. 4b illustrates a representative composite data signal received on one spacecraft channel, comprising data signal bursts transmitted from any of the ground stations of the system, including, but not limited to, the master ground station and other ground stations which perform ranging. As illustrated in FIG. 4b, the data information is in the form of data bursts which arrive at the spacecraft in synchronism with the frame timing established by the master station's ranging signals. More particularly, FIG. 4b illustrates a data stream 430 including a plurality of bursts of data during each frame interval. As illustrated, there are three bursts within each frame interval, but more or fewer may be used as desired. Each data burst lies within a time slot, and thus, the first data burst, with its preamble, lies within time slot 1 of the illustrated frame of data stream 430. The second data burst and its accompanying preamble lie within slot 2, and the third burst lies within slot 3. Those skilled in the art know that each burst-and-preamble may come from a different one of the ground stations, or consecutive bursts of data may originate from a single ground station, depending upon the scheduling protocol in operation. The time of the beginning of a frame interval at the spacecraft can be determined at each ground station by simply subtracting that ground station's uplink propagation delay from the time of arrival at the ground station of the beginning of a unique word in the master timing signals. Since the slot durations are known a priori or broadcast dynamically on a control channel, the starting times of all future slot intervals at the spacecraft can be predicted at each ground station, and updated as each new network timing signal arrives. The time at which the beginning of a packet must be transmitted by a ground station in order to arrive at the spacecraft at the beginning of a slot interval is then determined at that ground station by selecting a slot interval during which the spacecraft is to process the packet, and subtracting one additional uplink propagation delay from the starting time of that particular slot interval at the spacecraft.

Figure 4C:
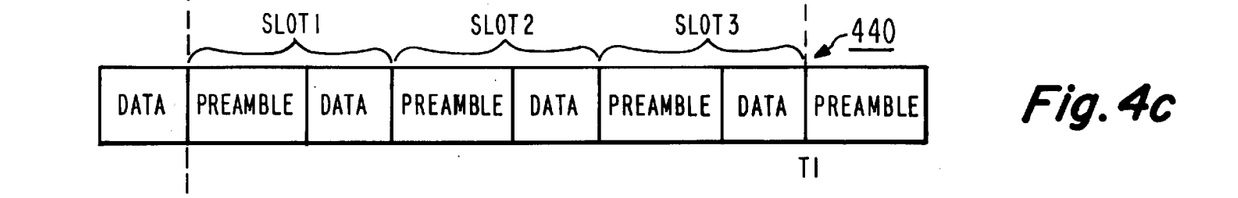
Figure 4D:
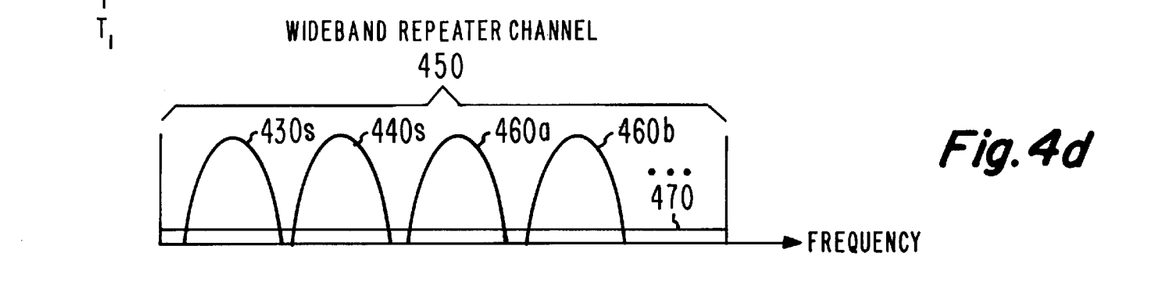
FIG. 4d illustrates the frequency spectra of the ranging signal of FIG. 4a and the data signals of FIGS. 4b and 4c.

The bursts of data of FIG. 4b all lie within a relatively narrow-band channel within a wideband repeater channel of the spacecraft. FIG. 4c illustrates another stream of data 40 which may pass through the wideband repeater channel on another relatively narrowband channel within the wideband repeater channel of the spacecraft. The elements of the data stream 440 of FIG. 4c are similar to those described for data stream 430 of FIG. 4b, and the timing is established in the same fashion. FIG. 4d illustrates the frequency plan for the wideband repeater channel 450 bandwidth, and within the wideband repeater channel 450, the spectra of a plurality of narrower-band data channels, one of which is designated 430s to indicate that it represents the spectrum of the data stream 430 of FIG. 4b, another is marked 440s to indicate that it represents the spectrum of data stream 440, and yet others of which are designated 460a, 460b, . . . to indicate that other data channels may additionally be carried through the repeater. The spectrum of the wideband or spread-spectrum signal represented by data stream 410 of FIG. 4a is represented in FIG. 4d as a low-level noise-like signal 470, which is selected in known fashion so as not to interfere with the narrow-band signals 430s, 440s, etc.

Figure 5:
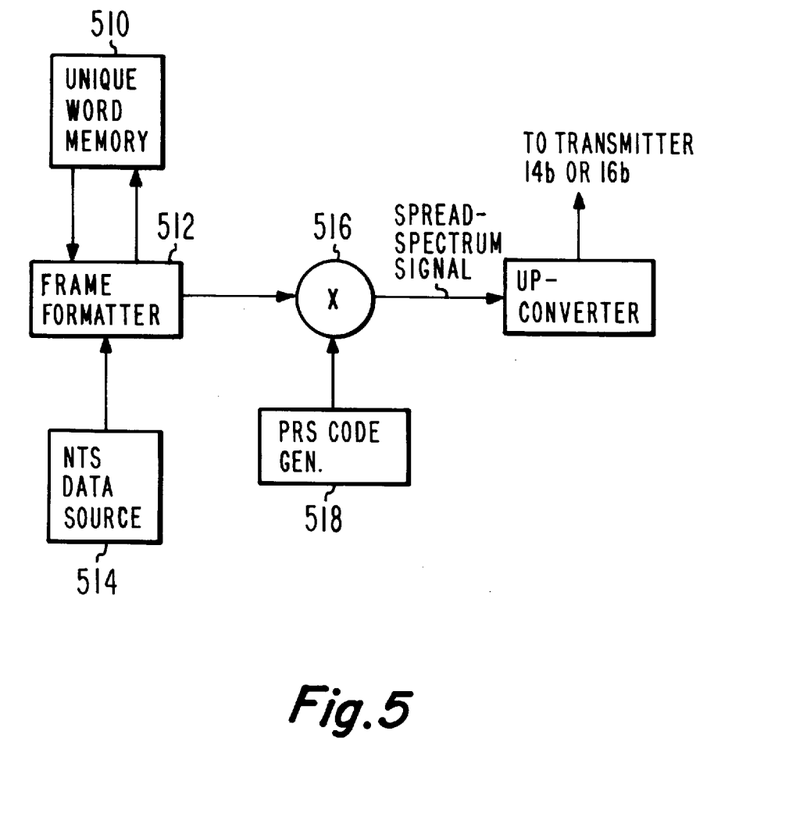
FIG. 5 is a simplified block diagram of a portion of the ground station of FIG. 1 which generates the ranging signal.

FIG. 5 is a simplified block diagram of a portion of blocks 14e, 16e, or 18e of the ground stations of FIG. 1. In FIG. 5, a unique-word memory 510 is periodically addressed by a frame formatter 512, and provides a replica of the unique word to the formatter. The frame formatter 512 combines the unique word with network timing signal (NTS) data from a source 514. In the case of the master ground station 14 of FIG. 1, the NTS data includes the calculated spacecraft position, and in the case of other ranging stations 16 or 18, NTS source 514 includes calculated or averaged range to the spacecraft. The time-sequence-combined signals produced by formatter 512 of FIG. 5 are applied to a mixer 516 together with a spreading code from a pseudorandom signal (PRS) generator 518. The spreading code modulates the signals produced by formatter 512, to produce rectangular chips of a spread-spectrum signal. These chips are the fundamental pulses or signalling elements of the spread-spectrum signal. The spread-spectrum signal is applied to an up-converter 520 for converting the spread-spectrum signal to the desired carrier frequency, which is in the band of the wideband repeater of the spacecraft.

A purpose of the invention is to avoid loss of usable communication spectrum and repeater utilization time, by allowing the packets of information to be transmitted to the spacecraft at times selected so that each packet arrives at the spacecraft in synchronism with a spacecraft time slot. In other words, the transmission of a packet must be timed so the beginning of a packet arrives at the spacecraft at the beginning of a slot interval, and so that its end is also within the slot interval. In this way, a transmitted packet cannot overlap onto another time slot, and thereby interfere with another packet occupying that time slot. The invention, then, relates to timing the packet transmissions to arrive synchronous with the slot intervals at the spacecraft, regardless of the packet scheduling method. The invention can even be used with contention-type scheduling systems, in which packets transmitted by different ground stations may occupy the same time slot at the spacecraft, with retransmission of these packets that have collided in other time slots being accomplished in some predetermined manner; i.e. slotted Aloha. According to the invention, a single packet ideally never overlaps two different slot intervals, and even if contention allocation is used, the throughput of the communication system is improved by preventing a single packet from destroying or contending with information in either of the two adjacent time slots. The broadcast of all the necessary time synchronization data uses network resources efficiently when the network includes a large number of terminals.

Thus, a spacecraft communication system according to the invention includes a spacecraft (10) orbiting a heavenly body, such as Earth. The spacecraft (10) includes a wideband transponder or repeater channel. The spacecraft tends to move relative to the heavenly body, as a result of which its distance from various ground stations (14, 16, 18, 36) tends to change with time. First (14), second (16) and third (18) ground stations are located on the surface of the heavenly body. Each of the first (14), second (16), and third (18) ground stations transmits wideband coded ranging signals unique to itself to the spacecraft (10), and each receives the ranging signals back from the spacecraft. Each of the first (14), second (16), and third (18) ground stations includes a range estimating arrangement (14d, 16d, 18d) which calculates its range to the spacecraft (10) from the measured delay between its transmitted and received ranging signals; this data is then broadcast via the range signals. The second (16) and third (18) ground stations each include encoders (16e, 18e) for encoding the range information onto the spread spectrum ranging signals. A spacecraft location determining arrangement (26, FIG. 2) is coupled to (and may be located at) the first ground station (14), for receiving the range information relating to the first, second and third ground stations, and for determining the current location of the spacecraft. An encoding arrangement (14e, FIG. 5) is coupled to the spacecraft location determining arrangement (26) and to the first ground station (14), for encoding the current spacecraft location onto the ranging signal of the first ground station for transmission to the spacecraft. A data signal transmitter (14b, 16b, 18b, 36b) is associated with any ground station (including, if desired, a ground station (36) which does not perform ranging), for transmitting data to the spacecraft for retransmission thereby. The data signal transmitter (14b, 16b, 18b, 36b) transmits the data signal by time division multiple access, using the current spacecraft location information and frame timing epoch originating from the first ground station to aid in synchronization of the time division multiple access.

A method for operating a communication system according to the invention includes the step of transmitting data signals (430), intended to be received at a second ground station, toward a transponder station from a first ground station, with the transmissions lying within a frequency channel. The data transmitted by the first ground station is received at the transponder station, together with any other signals arriving within the frequency channel. The transponder retransmits the same data, and any associated signals, toward the first and second ground stations. At the second ground station, the data retransmitted by the repeater station is received, and routed, if appropriate, to a utilization arrangement. At the first ground station, an identifiable word (412), modulated or spread by a pseudorandom code, is transmitted toward the repeater station, using spectrum also allocated to the data channels. At the first ground station (14), the identifiable word is received, and the round-trip propagation time delay is measured or noted. The range from the first ground station to the repeater station is determined from the propagation delay. In a particular embodiment of the method, the steps of (a) transmitting data toward a transponder station within a frequency channel, (b) at the transponder station, receiving the data transmitted by the first ground station, and retransmitting the same data, and any associated signals, toward the first and second ground stations, (c) at the second ground station, receiving the data retransmitted by the repeater station, and (d) at the first ground station, transmitting an identifiable word, modulated by a pseudorandom code, toward the repeater station, all include the step of transducing signals with a spacecraft repeater station. According to a further aspect of the method of the invention, the method further includes, at the first ground station, the step of modulating the pseudorandom code with information relating to one of (a) the round-trip time duration and (b) the range determined in the step of determining the range. It may also include the step of, at a master station different from the first station, receiving the pseudorandom signal originating from the first ground station and from other similar ground stations, and decoding the pseudorandom signal and corresponding pseudorandom signals from the similar ground stations to assemble a set of range measurements, and determining the location of the spacecraft from the set of range measurements. In a particularly advantageous method according to the invention, the spacecraft location is modulated onto a master station carrier at the master ground station, and transmitted toward the spacecraft, whereby the spacecraft retransmits the master station carrier to at least the first ground station. Another advantageous aspect of the invention lies in modulating the spacecraft location onto a pseudorandom sequence, and at the first ground station, decoding the master station carrier to recover the spacecraft location. At one or many of the ground stations, the data may be transmitted within time slots, which are timed to arrive at the spacecraft substantially simultaneously with the beginning of slot intervals established at the spacecraft.

In a preferred embodiment of the invention, the ranging accuracy may be improved by the scheme described in [copending patent application Ser. No. [08/691,964], filed [Aug. 5, 1996], in the name of [Hershey et al.], and entitled, "Method and Apparatus for TDMA Slot Synchronization with Precision Ranging" (RDMM24034)].

Other embodiments of the invention will be apparent to those skilled in the art. For example, while the arrangement of FIG. 1 processes the time delay to determine range at each of the ground stations, and transmits the range to the master station, the time difference itself, or the absolute times of the transmission and reception, may instead be transmitted to the master station, which can perform the corresponding range determinations for each of the other ground stations. While a master station and three additional stations have been illustrated and described, the number of ground stations may be any number. While the invention is directed toward reducing the guard times required in each slot interval, it should be understood that the guard intervals may still be necessary. While it would require determination of the spacecraft location at each of the ground stations, it would be possible to transmit the three measured ranges to each of the ground stations, and perform the location calculation at each ground station. Those skilled in the art know that for purposes of data communication through a spacecraft transponder, "frequency reuse" of a portion of a channel's frequencies for an adjacent channel may be accomplished by polarization-selective transmission of the channels. Instead of modulating the body (the message-carrying portion) of the ranging signals of the master ground station with spacecraft location data, it may instead, or in addition, be desirable to modulate the body with the various ranges determined at the ranging ground stations, so that each station may perform its own spacecraft location calculations. As a further possibility, the body of the ranging signal might include network control information such as a second time marker for control of the ranging separately from synchronization of the network. As yet a further example of control information, the body of the ranging signal might include system loading information, which could be used to manage traffic patterns by, for example, spreading peaks of usage, and thereby assist in scheduling. Ground stations may be non-stationary or mobile, as long as they have some way to determine the coordinates of their locations. Non-ranging ground stations are particularly well-suited to such mobile operation.

What is claimed is:

1. A method for operating a communication system, said method comprising the steps of:

at a first ground station, transmitting data toward a repeater station within a frequency channel, which data is intended to be received at a second ground station;

at said repeater station, receiving said data transmitted by said first ground station, and any other signals arriving within said frequency channel, and retransmitting the same data, and any associated signals, toward said first and second ground stations;

at said second ground station, receiving said data retransmitted by said repeater station, and routing said data to a utilization means;

at said first ground station, continuously transmitting spread-spectrum ranging signals including identifiable synchronization symbols toward said repeater station over the same frequency channel as said data, said ranging signals having a bandwidth greater than that of said data, and which may extend over substantially the entirety of said frequency channel;

at said first ground station, receiving said identifiable synchronization symbols, and noting the propagation time delay; and from said propagation time delay, determining the range from said first ground station to said repeater station.

2. A method according to claim 1, wherein said steps of (a) transmitting data toward a repeater station within a frequency channel, (b) at said repeater station, receiving said data transmitted by said first ground station, and retransmitting the same data, and any associated signals, toward said first and second ground stations, (c) at said second ground station, receiving said data retransmitted by said repeater station, and (d) at said first ground station, transmitting identifiable synchronization symbols included in spread-spectrum ranging signals toward said repeater station, all include the step of transducing signals with a spacecraft repeater station.

3. A method according to claim 2, wherein said method further includes, at said first ground station, the step of modulating said spread-spectrum ranging signals with information relating to one of (a) said propagation time delay and (b) said range determined in said step of determining the range.

4. A method according to claim 2, further including the step of, at a master station different from said first station, receiving said spread-spectrum ranging signals originating from said first ground station and from other similar ground stations, and decoding said spread-spectrum ranging signals and corresponding spread-spectrum ranging signals from said similar ground stations, to assemble a set of range measurements; and from said set of range measurements, determining the spacecraft location.

5. A method according to claim 4, further comprising the step of, at said master station, modulating said spacecraft location onto a master station carrier, and transmitting said master station carrier toward said spacecraft, whereby said spacecraft retransmits said master station carrier to at least said first ground station.

6. A method according to claim 5, wherein said step of modulating said spacecraft location onto a master station carrier comprises the step of:

modulating said spacecraft location onto spread-spectrum signals; and further comprising the step of:
at said first ground station, decoding said master station carrier to recover said spacecraft location.

7. A method according to claim 6, further comprising the step, at said first ground station, of:

transmitting said data within time slots, said transmitting being timed, by the use of said spacecraft location, to cause said data within time slots to begin to arrive at said spacecraft substantially at the beginning of slot intervals scheduled at said spacecraft.

8. A method according to claim 2, wherein said step of determining the range is performed at said first ground station.

9. A method for synchronization of TDMA transmissions from ground stations to a spacecraft, for maximizing the utilization of a spacecraft channel, said method comprising the steps of:

at each ground station, continuously transmitting a unique word to said spacecraft, said unique word comprising a plurality of bits modulated by a pseudorandom code which is unique to said ground station at a chip rate selected to spread the bandwidth of said unique word:
at each of said ground stations, responding to the first one of its own unique words received after said step of transmitting a unique word, by noting the reception time of said unique word;
at said ground station, taking the difference between said transmission and reception times, to form an estimate of the propagation delay between said ground station and said spacecraft;
at said ground station, repeating, a predetermined number of times, said steps of transmitting a unique word, responding to the first one of said own unique words, and taking the difference between transmission and reception times of each of said unique words, to thereby form a group of delays;
at said ground station, if said propagation delays of said group of delays are within a predetermined number of chip periods, deeming the propagation delay to be the number of said chips in said reception times of said group of delays, and if not, repeating said steps of transmitting a pseudorandom unique word, responding to the first one of said unique words, taking the difference between transmission and reception times of said unique word, repeating, and determining, until said propagation delay is determined.

10. A method according to claim 9, wherein said predetermined number of times is three.

11. A method according to claim 9, further including the step of, at said ground station, transmitting, to others of said ground stations by way of said spacecraft, information based upon said propagation delay.

12. A method according to claim 11, further comprising the steps of:

at a master ground station, receiving said information based upon said propagation delay;
at said master ground station, retrieving from memory the location of those of said ground stations for which information based upon said propagation delay is received; and
at said master ground station, calculating the location of said spacecraft from said received propagation delays and said locations of said ground stations.

13. A method according to claim 12, further comprising the step of transmitting said location of said spacecraft from said master ground station to other ground stations.

14. A spacecraft communication system, comprising:

a spacecraft orbiting a heavenly body, said spacecraft including a wideband transponder channel, said spacecraft tending to move relative to heavenly body;
first, second and third ground stations on the surface of said heavenly body, each of said ground stations continuously transmitting to said spacecraft wideband modulated ranging signals which may occupy substantially all of said wideband transponder channel and unique to itself, and receiving said ranging signals back from said spacecraft, each of said ground stations calculating its range to said spacecraft from the delay between transmitted and received ranging signals, to thereby form range signals, said second and third ground stations encoding said range information onto said modulated ranging signals;
spacecraft location determining means coupled to said first ground station, for receiving said range information from said first ground station, said second and third ground stations, and for determining the current location of said spacecraft;
encoding means coupled to said spacecraft location determining means and to said first ground station, for encoding said current spacecraft location onto said ranging signals of said first ground station for transmission to said spacecraft;
data signal transmission means associated with a ground station, for transmitting data having bandwidth substantially less than that of said wideband modulated ranging signals to said spacecraft for retransmission thereby, said data signal transmission means transmitting said data signals by time division multiple access, and using said current spacecraft location originating from said first ground station to aid in synchronization of said time division multiple access.

15. A communication system according to claim 14, further comprising an additional ground station which performs no independent ranging, said additional ground station further comprising:

means for receiving signals conveying information relating to one of (a) said location of said spacecraft and (b) said ranges of said first, second and third stations from said spacecraft; and means associated with said further ground station for determining propagation delay between said further ground station and said spacecraft based upon knowledge of the location of said further ground station and said location of said spacecraft.

16. A communication system according to claim 15, wherein said further ground station further comprises means for receiving said ranges of said first, second and third stations from said spacecraft, for determining said location of said spacecraft based upon knowledge of said locations of said first, second and third ground stations.

17. A spacecraft communication system, comprising:

a spacecraft orbiting a heavenly body, said spacecraft including a wideband transponder channel, said spacecraft tending to move relative to heavenly body;

first, second and third ground stations on the surface of said heavenly body, each of said ground stations continuously transmitting wideband modulated ranging signals unique to itself to said wideband transponder channel of said spacecraft, and receiving said ranging signals back from said spacecraft, each of said ground stations calculating its range to said spacecraft from the delay between transmitted and received ranging signals, to thereby form range signals, said second and third ground stations encoding said range information onto said modulated ranging signals;

spacecraft location determining means coupled to said first ground station, for receiving said range information from said first ground station, said second and third ground stations, and for determining the current location of said spacecraft;

encoding means coupled to said spacecraft location determining means and to said first ground station, for encoding said current spacecraft location onto said ranging signals of said first ground station for transmission to said spacecraft;

data signal transmission means associated with a ground station, for transmitting data to said spacecraft for retransmission thereby, said data signals having a bandwidth substantially less than said bandwidth of said wideband transponder channel, said data signal transmission means transmitting said data signals by time slotted Aloha, and using said current spacecraft location originating from said first ground station to aid in synchronization of said time division multiple access.

\* \* \* \* \*